United States Patent
Tamura et al.

(10) Patent No.: US 7,535,096 B2
(45) Date of Patent: May 19, 2009

(54) GLASS SUBSTRATE AND CAPACITANCE-TYPE PRESSURE SENSOR USING THE SAME

(75) Inventors: Manabu Tamura, Miyagi-ken (JP);
Takashi Hatanai, Miyagi-ken (JP);
Kazuhiro Soejima, Miyagi-ken (JP);
Koichi Takahashi, Miyagi-ken (JP);
Munemitsu Abe, Miyagi-ken (JP);
Shinji Murata, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 208 days.

(21) Appl. No.: 11/168,249

(22) Filed: Jun. 27, 2005

(65) Prior Publication Data

US 2006/0001128 A1    Jan. 5, 2006

(30) Foreign Application Priority Data

Jul. 2, 2004 (JP) ............................. 2004-196341
Apr. 22, 2005 (JP) ............................. 2005-125476

(51) Int. Cl.
*H01L 23/121* (2006.01)

(52) U.S. Cl. ............................. 257/704; 257/E21.499; 257/774

(58) Field of Classification Search ................ 257/644, 257/684, 704, 678, E21.499, E23.001, E21.5, 257/E21.501, 774, 794

See application file for complete search history.

(56) References Cited

U.S. PATENT DOCUMENTS 4,875,134 A * 10/1989 Kuisma ................... 361/283.1
5,050,034 A    9/1991 Hegner et al.
6,903,637 B2 * 6/2005 Miyazaki et al. .............. 335/78

FOREIGN PATENT DOCUMENTS

DE    4006108 A1    8/1991
JP    2772111    4/1998

OTHER PUBLICATIONS

European Search Report dated Oct. 19, 2005 from corresponding European Application No. 05 254 001.0.

* cited by examiner

*Primary Examiner*—Hoa B Trinh
(74) *Attorney, Agent, or Firm*—Beyer Law Group LLP

(57) ABSTRACT

A glass substrate has a pair of main surfaces opposite to each other. Two island-shaped portions made of silicon are buried in the glass substrate. The two island-shaped portions are exposed from the two main surfaces of the glass substrate, respectively. An electrode is formed on one main surface of the glass substrate so as to be electrically connected to one exposed portion of one island-shaped portion, and another electrode is formed thereon so as to be electrically connected to one exposed portion of the other island-shaped portion. Still another electrode is formed on the other main surface of the glass substrate so as to be electrically connected to the other exposed portion of the one island-shaped portion. A silicon substrate having a pressure sensing diaphragm is bonded to the other main surface of the glass substrate.

5 Claims, 8 Drawing Sheets

GLASS SUBSTRATE AND CAPACITANCE-TYPE PRESSURE SENSOR USING THE SAME

BACKGROUND OF THE INVENTION

1. Field of the Invention

The present invention relates to a glass substrate and a capacitance-type pressure sensor having, as a pressure sensing member, a silicon diaphragm on a glass substrate.

2. Description of the Related Art

This type of pressure sensor includes a differential pressure sensor for measuring relative pressure and an absolute pressure sensor for measuring absolute pressure.

FIG. 10 is a cross-sectional view schematically showing the structure of a conventional capacitance-type pressure sensor. A capacitance-type pressure sensor 1 shown in FIG. 10 is formed by bonding a glass substrate 4 to a silicon substrate 3 having a pressure sensing diaphragm 2, which is a movable electrode to which pressure to be measured is applied. An electrode 5 is provided on a surface of the silicon substrate 3 facing the glass substrate 4. The pressure sensing diaphragm 2 is separated from the glass substrate 4 at a predetermined gap, and a space 6 is formed therebetween. A fixed electrode 7 is formed in the space 6 on the glass substrate, and a connecting electrode 8 is formed on a bottom surface and a side surface of a through hole 4a passing through the glass substrate 4 so as to be electrically connected to the fixed electrode 7 (for example, see Japanese Patent No. 2772111).

The conventional capacitance-type pressure sensor shown in FIG. 10 is manufactured as follows. First, the through hole 4a is formed in the glass substrate 4 by a sand blast process, and the glass substrate having the through hole 4a therein is bonded to the silicon substrate. Then, silicon is removed with one covering the through hole 4a left. Subsequently, the fixed electrode 7 and the connecting electrode 8 are formed so as to be electrically connected to the remaining silicon, and then the silicon substrate 3 having the pressure sensing diaphragm 2 and the electrode 5 facing the glass substrate 4 is bonded to the glass substrate 4 such that the space 6 is formed therebetween.

However, in the conventional capacitance-type pressure sensor, as described above, the through hole 4a is formed by the sand blast process, and the connecting electrode 8 is formed on the side surface of the through hole 4a. In general, since the sand blast process causes the processed surface to be excessively rough, it is difficult to mount a connecting electrode 8a on the processed surface with high precision, which causes the connecting electrode 8a to be broken. Further, in this structure, since the processed surface becomes rough, a poor connection of the connecting electrode occurs, which results in a lower degree of airtightness. When the degree of airtightness is deteriorated, the pressure sensing diaphragm is not normally operated, which makes it difficult to accurately measure a pressure variation.

SUMMARY OF THE INVENTION

The invention is designed to solve the above-mentioned problems, and it is an object of the invention to provide a glass substrate for a capacitance-type pressure sensor capable of accurately measuring a pressure variation.

In order to achieve the above object, according to a first aspect of the invention, a glass substrate includes a glass substrate body that has a pair of main surfaces opposite to each other; and island-shaped silicon portions that are buried in the glass substrate such that at least portions thereof are exposed from the pair of main surfaces, respectively.

According to this structure, it is possible to form wiring lines for fixed electrodes while maintaining a high degree of adhesion at interfaces between the glass substrate and the island-shaped portions and at an interface between the glass substrate and the silicon substrate. Therefore, it is possible to achieve a capacitance-type pressure sensor capable of accurately measuring a pressure variation.

In the glass substrate of the invention, it is preferable that the island-shaped silicon portions be electrically connected to each other by a silicon layer formed on one main surface of the glass substrate body.

Further, in the glass substrate of the invention, it is preferable that the island-shaped silicon portions have metal layers buried therein so as to be exposed from at least one of the main surfaces of the glass substrate body, respectively. According to this structure, it is possible to reduce the resistance of a conductive portion of the island-shaped portion, and thus to reduce the power consumption of a device used.

Furthermore, in the glass substrate of the invention, it is preferable that interfaces between the glass substrate and the island-shaped portions have Si—Si bonding or Si—O bonding. According to this structure, since the interfaces between the glass substrate body and the island-shaped silicon portions have Si—Si bonding or Si—O bonding, the island-shaped silicon portions are reliably bonded to the glass substrate, which makes it possible to improve the airtightness therebetween.

According to a second aspect of the invention, a capacitance-type pressure sensor includes the above-mentioned glass substrate; electrodes that are formed on the main surface of the glass substrate from which the island-shaped silicon portions are exposed, and that are electrically connected to the island-shaped silicon portions, respectively; and a silicon substrate that is provided on the main surface of the glass substrate having the electrodes formed thereon. In this structure, the silicon substrate includes a pressure sensing diaphragm that is separated from the electrode at a predetermined gap and that is deformed by pressure to be measured, and a variation in capacitance between the electrode and the pressure sensing diaphragm is measured as a pressure variation.

According to this structure, since a high degree of adhesion is obtained at the interfaces between the glass substrate and the island-shaped portions and at the interface between the glass substrate and the silicon substrate, it can be considered that the displacement of the pressure sensing diaphragm accurately reflects pressure to be measured. Therefore, it is possible to accurately measure capacitance between the pressure sensing diaphragm and the fixed electrode, and thus to precisely measure a pressure variation corresponding to a variation in capacitance.

According to a third aspect of the invention, a glass substrate manufacturing method includes forming island-shaped portions on a surface of a silicon substrate; pressing the island-shaped portions against a glass substrate while applying heat to bond the silicon substrate and the glass substrate; and polishing the surface of the glass substrate to expose the island-shaped portions from the surface of the glass substrate.

According to this method, it is possible to bond the glass substrate to the island-shaped portions and the glass substrate to the silicon substrate with high adhesion. Thus, it is possible to achieve a glass substrate for a capacitance-type pressure sensor capable of accurately measuring a pressure variation.

Further, in the glass substrate manufacturing method of the invention, it is preferable that the island-shaped portions be formed by forming a mask on the surface of the silicon substrate and by performing a sand blast process on the silicon substrate having the mask formed thereon. In addition, preferably, the island-shaped portions are formed by half-dicing the surface of the silicon substrate.

According to a fourth aspect of the invention, a method of manufacturing a capacitance-type pressure sensor includes: manufacturing a glass substrate by the above-mentioned method; forming electrodes on the glass substrate so as to be electrically connected to the island-shaped portions that are exposed from the glass substrate, respectively; and bonding, to the glass substrate, a silicon substrate having a pressure sensing diaphragm that is deformed by pressure to be measure such that the diaphragm is separated from the electrode at a predetermined gap.

According to this method, it is possible to bond the glass substrate to the island-shaped portions and the glass substrate to the silicon substrate with high adhesion. Therefore, it is possible to accurately measure a variation in capacitance between the pressure sensing diaphragm and the fixed electrode and thus to achieve a capacitance-type pressure sensor capable of accurately measuring a pressure variation.

DESCRIPTION OF THE PREFERRED EMBODIMENT

Hereinafter, preferred embodiments of the invention will be described in detail with reference to the accompanying drawings.

First Embodiment

Figure 1:
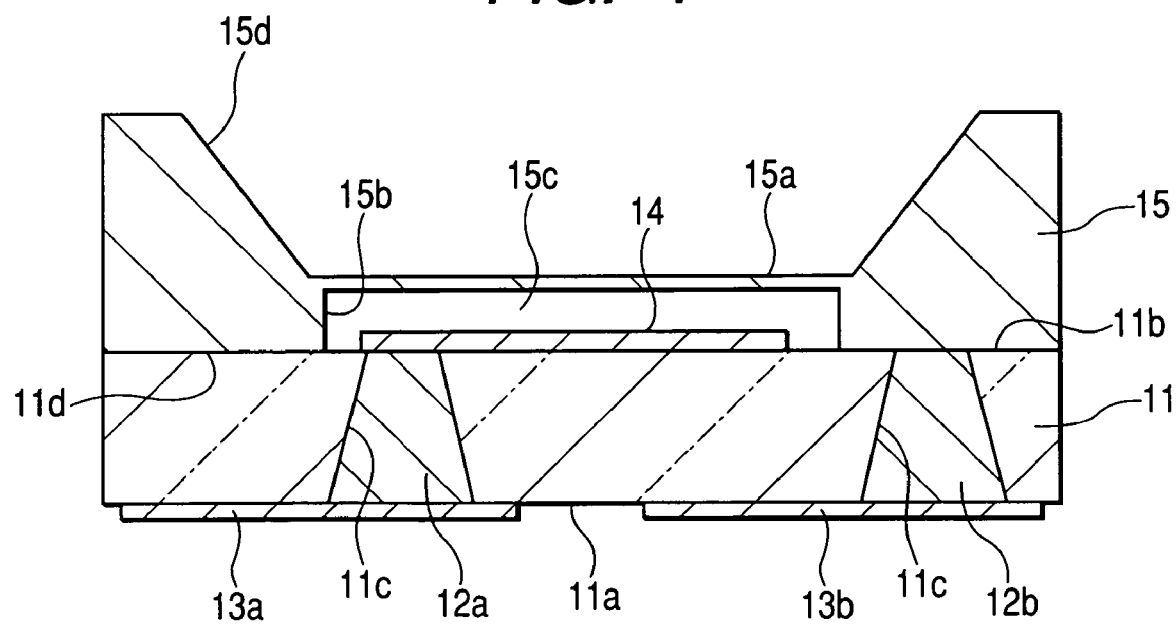
FIG. 1 is a cross-sectional view schematically illustrating the structure of a capacitance-type pressure sensor having a glass substrate according to a first embodiment of the invention.

FIG. 1 is a cross-sectional view schematically illustrating the structure of a capacitance type pressure sensor having a glass substrate according to a first embodiment of the invention.

In FIG. 1, reference numeral 11 denotes a glass substrate. The glass substrate 11 has a pair of main surfaces 11a and 11b opposite to each other. Island-shaped portions 12a and 12b made of silicon are buried in the glass substrate 11. The island-shaped portion 12a is a connecting portion with a fixed electrode, and the island-shaped portion 12b is a connecting portion with a movable electrode. The island-shaped portions 12a and 12b are exposed from the two main surfaces of the glass substrate 11. In addition, the formation of the island-shaped portions 12a and 12b will be described later.

An electrode 13a is formed on the main surface 11a of the glass substrate 11 so as to be electrically connected to one exposed surface of the island-shaped portion 12a, and an electrode 13b is also formed thereon so as to be electrically connected to one exposed surface of the island-shaped portion 12b. This structure in which the electrodes 13a and 13b are formed on the same main surface 11a enables an external device to be easily connected thereto. In addition, an electrode 14 is formed on the main surface 11b of the glass substrate 11 so as to be electrically connected to the other exposed surface of the island-shaped portion 12a.

Further, a silicon substrate 15 having a pressure sensing diaphragm 15a (movable electrode) is bonded to the main surface 11b of the glass substrate 11. The pressure sensing diaphragm 15a is provided by respectively forming concave portions in both surfaces of the silicon substrate 15 by, for example, etching. The concave portion provided in a surface of the silicon substrate 15 where the glass substrate is bonded has a sufficiently large size to store the electrode 14, and a space (gap) 15c is formed in the concave portion when the silicon substrate 15 is bonded to the glass substrate 11. That is, the space 15c is formed by the pressure sensing diaphragm 15a and a side surface 15b of the concave portion of the silicon substrate 15. Therefore, a predetermined gap is formed between the pressure sensing diaphragm 15a and the electrode 14, and thus capacitance is formed between the pressure sensing diaphragm 15a and the electrode 14.

In this case, it is preferable that interfaces 11c between the glass substrate 11 and the island-shaped portions 12a and 12b have a high degree of adhesion. As will be described later, the interfaces 11c are formed by pushing the island-shaped portions 12a and 12b against the glass substrate 11 while heating them. This method enables the interfaces 11c to have a high degree of adhesion. Alternatively, it is also possible to obtain a high degree of adhesion by pushing the island-shaped portions 12a and 12b against the glass substrate 11 and then by performing an anode bonding process thereon. The anode bonding process means a process of generating strong electrostatic attraction between silicon and glass by applying a predetermined voltage (for example, a voltage of 300 V to 1 kV) at a predetermined temperature (for example, a temperature smaller than 400° C.) to generate a covalent bond at the interface therebetween. The covalent bond at the interface means Si—Si bonding or Si—O bonding between an Si atom of silicon and an Si atom contained in glass. Therefore, a strong bonding between silicon and glass occurs by the Si—Si bonding or Si—O bonding, which causes a very high degree of adhesion at the interface therebetween. In order to perform the anode bonding process with high efficiency, it is preferable that the glass substrate 11 be made of a glass material (for example, Pyrex (registered trademark) glass) containing alkali metal, such as sodium.

This structure is equally applied to an interface between the main surface 11b of the glass substrate 11 and the silicon substrate 15. That is, the silicon substrate 15 is mounted on the main surface 11b of the glass substrate 11, and then the anode bonding process is performed thereon, which results an improve in the adhesion therebetween. As such, by improving the adhesion at the interface 11c between the glass substrate 11 and the island-shaped portion 12a and at an interface 11d between the glass substrate 11 and the silicon substrate 15, it is possible to improve the airtightness of the space 15c formed between the pressure sensing diaphragm 15a and the main surface 11b of the glass substrate 11.

In the capacitance-type pressure sensor having the above-mentioned structure, a predetermined capacitance is formed between the pressure sensing diaphragm 15a and the electrode 14 on the glass substrate 11. When pressure is applied to the capacitance-type pressure sensor, the pressure sensing diaphragm 15a is operated by the applied pressure. Then, the pressure sensing diaphragm 15a is deformed. At that time, capacitance between the pressure sensing diaphragm 15a and the electrode 14 on the glass substrate 11 is varied. Therefore, it is possible to consider the capacitance as a parameter and the variation as a pressure variation. As described above, since a high degree of adhesion is obtained at the interface 11c between the glass substrate 11 and the island-shaped portion 12a and at the interface 11d between the glass substrate 11 and the silicon substrate 15, it is possible to consider the displacement of the pressure sensing diaphragm 15a as pressure to be measured. Therefore, it is possible to accurately measure the capacitance between the pressure sensing diaphragm 15a and the electrode 14, and thus to accurately measure a pressure variation corresponding to the variation of capacitance.

Next, a method of manufacturing the capacitance-type pressure sensor using a glass substrate according to this embodiment will be described. FIGS. 2A to 2E are cross-sectional views illustrating a glass substrate manufacturing method according to the first embodiment of the invention. FIGS. 3A to 3D are cross-sectional views illustrating a method of manufacturing the capacitance-type pressure sensor having the glass substrate obtained from FIG. 2E.

Figure 2A:
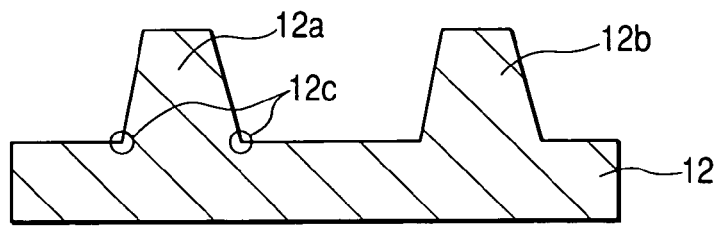
FIGS. 2A to 2E are cross-sectional views illustrating a method of manufacturing the glass substrate according to first and second embodiments of the invention.

First, a low-resistance silicon substrate 12 having impurities doped therein is prepared. As the impurities, n-type impurities or p-type impurities can be used. The impurities are doped, for example, at a concentration of about 0.01 Ω cm. The silicon substrate is etched to form the island-shaped portions 12a and 12b, as shown in FIG. 2A. As the etching method, dry etching or wet etching can be used. However, when the wet etching is performed, it is preferable to perform anisotropy etching for defining a crystal surface of the silicon substrate 12 such that a difference in etching rate occurs. In addition, in order to bond the silicon substrate 12 to a glass substrate, which will be described later, it is preferable that corner portions 12c of the island-shaped portions 12a and 12b be formed in curved lines.

Figure 2B:
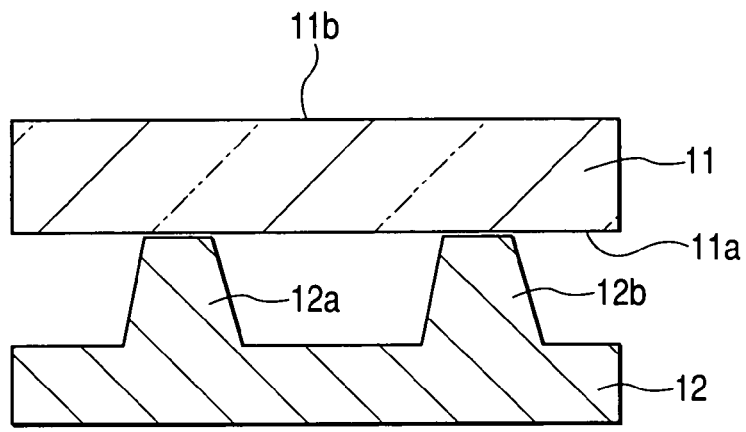
Figure 2C:
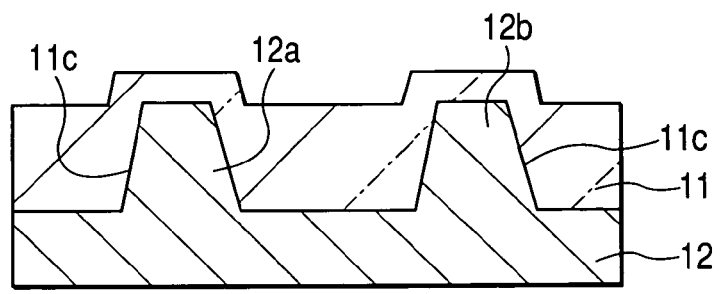

Subsequently, as shown in FIG. 2B, the glass substrate 11 is mounted on the silicon substrate 12 having the island-shaped portions 12a and 12b formed thereon. Then, the silicon substrate 12 and the glass substrate 11 are heated, and then, as shown in FIG. 2C, the silicon substrate 12 is pressed against the glass substrate 11 to push the island-shaped portions 12a and 12 in the main substrate 11a of the glass substrate 11, thereby bonding the silicon substrate 12 and the glass substrate 11. In this case, preferably, temperature is set to be smaller than a melting point of silicon and to deform glass. For example, a heating temperature of about 600° C. is preferable.

Further, in order to improve adhesion at the interfaces 11c between the glass substrate 11 and the island-shaped portions 12a and 12b of the silicon substrate 12, it is preferable to perform the anode bonding process. In this case, electrodes are placed on the silicon substrate 12 and the glass substrate 11, respectively, and then a voltage of about 300 V to 1 kV is applied thereto while applying heat at a temperature smaller than about 400° C. In this way, it is possible to improve adhesion at the interfaces 11c, and thus to improve the airtightness of the space 15c of the capacitance-type pressure sensor.

Figure 2D:
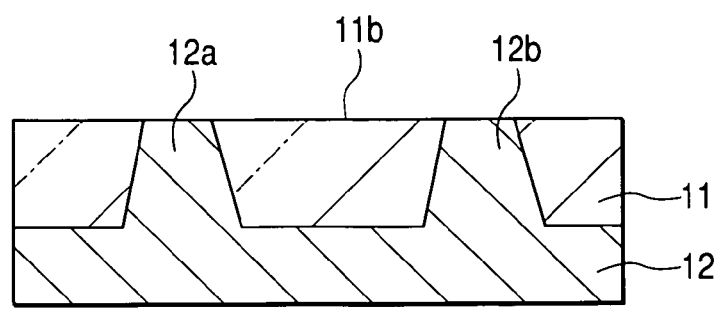
Figure 2E:
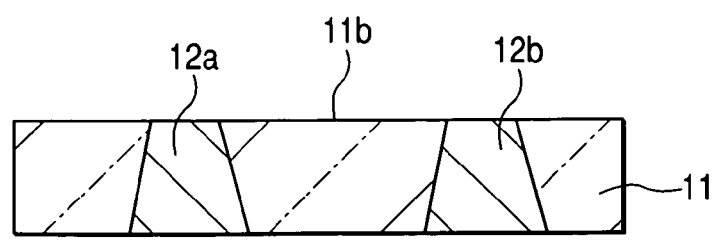

Subsequently, as shown in FIG. 2D, a polishing process is performed on the main surface 11b of the glass substrate 11 such that the island-shaped portions 12a and 12b are partially exposed from the main surface 11b. In this way, the island-shaped portions 12a and 12b are buried in the glass substrate 11. Then, as shown in FIG. 2E, the polishing process is performed on the silicon substrate 12 again such that the island-shaped portions 12a and 12b are partially exposed from both surfaces of the glass substrate 11. In this way, the glass substrate of the invention (FIGS. 2D and 2E) is manufactured.

Figure 3A:
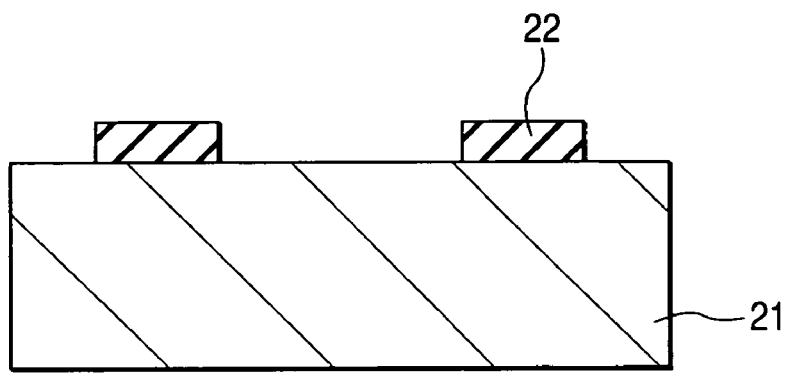
FIGS. 3A and 3D are cross-sectional views illustrating a method of forming island-shaped portions on a silicon substrate.

Next, a manufacturing process of the glass substrate according to the invention will be described. FIGS. 3A to 3D are cross-sectional views illustrating a method of forming the island-shaped portions 12a and 12b on the silicon substrate 12 shown in FIG. 2A. First, as shown in FIG. 3A, a mask 22 is provided on one main surface of a silicon substrate 21 in regions where the island-shaped portions 12a and 12b are formed. For example, a stencil mask or a mask composed of a resist or silicon oxide film can be used as the mask 22. When the mask 22 is composed of the resist or silicon oxide film, a resist layer or silicon oxide film is formed on the silicon substrate 21, and then the resist layer or silicon oxide film is patterned by a photolithography technique such that the resist layer remains in the regions where the island-shaped portions 12a and 12b are formed.

Figure 3B:
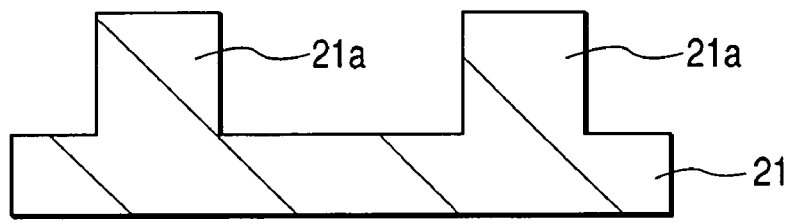

When dry etching is performed on the silicon substrate 21 shown in FIG. 3A, it is possible to form island-shaped portions 21a shown in FIG. 3B on the silicon substrate 21. For example, RIE (reactive ion etching) can be used as the dry etching. As such, by forming the island-shaped portions 21a using dry etching, it is possible to form the island-shaped portions 21a on the silicon substrate 21 at precise positions.

Figure 3C:
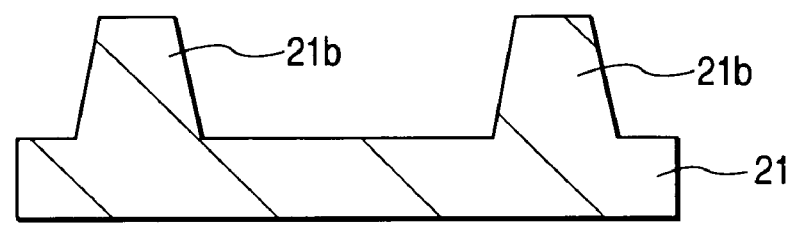

When wet etching is performed on the silicon substrate 21 shown in FIG. 3A, it is possible to form island-shaped portions 21b shown in FIG. 3B on the silicon substrate 21. For example, a KOH solution or aqueous solution of TMAH (tetramethylammonium hydroxide) can be used as an etchant for the wet etching. As such, by forming the island-shaped portions 21b using wet etching, it is possible to form the island-shaped portions 21b on the silicon substrate 21 at precise positions. In FIG. 3C, since the island-shaped portions 21b are formed in tapered shapes, the silicon substrate 21 can be easily bonded to a glass substrate, which will be described layer.

Figure 3D:
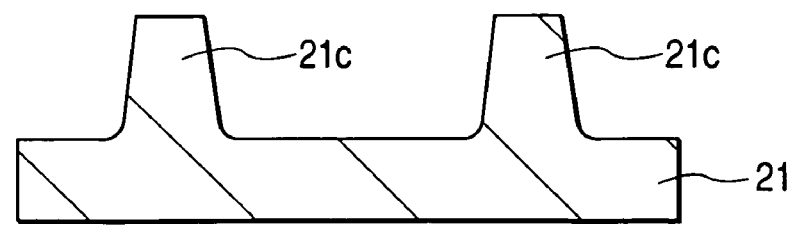

When a sand blast process is performed on the silicon substrate 21 shown in FIG. 3A, it is possible to form island-shaped portions 21c shown in FIG. 3D on the silicon substrate 21. The sand blast process is performed using particles having a diameter of several microns. As such, by forming the island-shaped portions 21c using the sand blast process, it is possible to form the tapered island-shaped portions 21c with vertical side walls. Therefore, the arrangement density of the island-shaped portions 21c can be improved. In addition, the sand blast process enables the above-mentioned manufacturing process to be performed at low costs and in a shot time since an expensive apparatus, such as a dry etching apparatus, is not needed.

Figure 4:
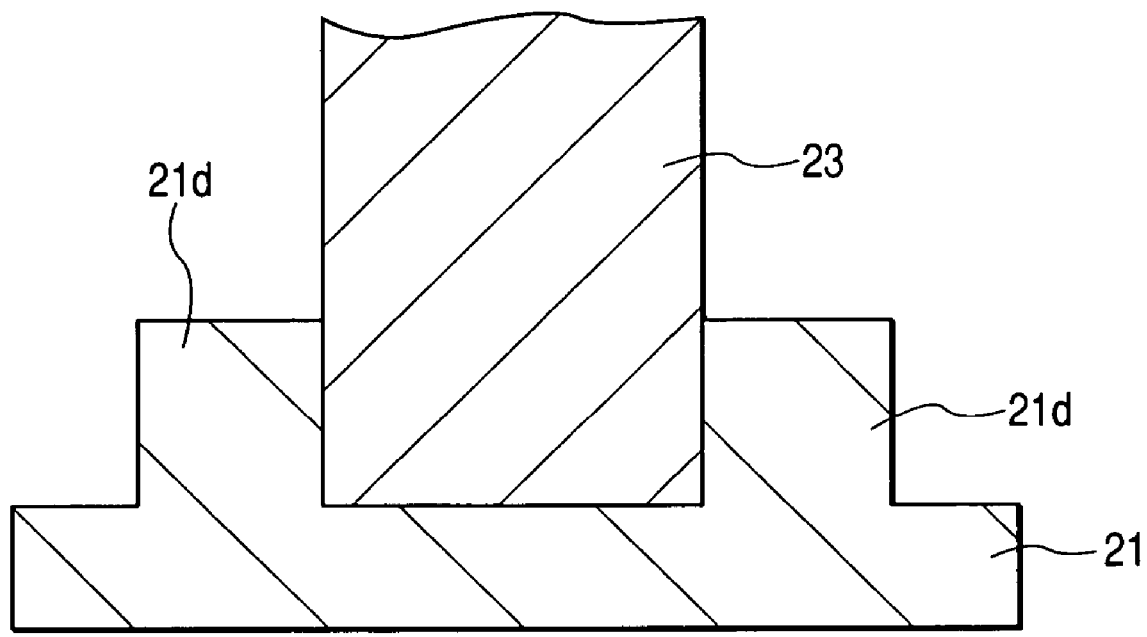
FIG. 4 is a view illustrating the method of forming the island-shaped portions on the silicon substrate.

Further, as shown in FIG. 4, it is possible to form island-shaped portions 21d by half-dicing (grooving) the surface of the silicon surface 21 using a dicing plate 23. As such, by forming the island-shaped portions 21d using the half-dicing, it is possible to form the island-shaped portions 21d with vertical side walls. Therefore, the arrangement density of the island-shaped portions 21d can be improved. In addition, the half-dicing enables the above-mentioned manufacturing process to be performed at low costs and in a shot time since an expensive apparatus, such as a dry etching apparatus, is not needed.

When the silicon substrate 12 is pressed against the glass substrate 11, gaps (grooves) may occur in the corner portions 12c of the island-shaped portions 12a and 12b, as shown in FIG. 2A. Therefore, in this case, it is preferable that an intermediate layer be provided between the silicon substrate 12 and the glass substrate 11 at the corner portions 12c in order to improve the adhesion therebetween. FIGS. 5A to 5E are cross-sectional views illustrating a process of forming a layer on a silicon substrate and then of pressing the silicon substrate against a glass substrate.

Figure 5A:
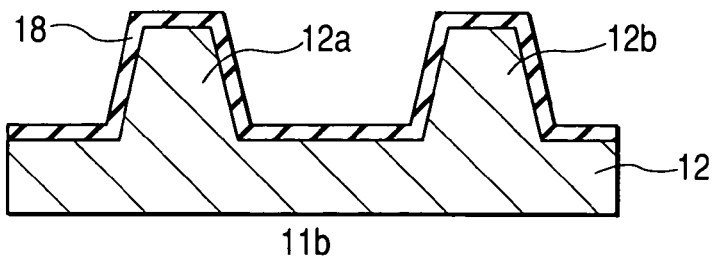
FIGS. 5A to 5E are cross-sectional views illustrating a process of forming a layer on the silicon substrate and then of pressing the silicon substrate against the glass substrate.

The island-shaped portions 12a and 12b are formed on the silicon substrate 12 in the above-mentioned manner. Then, as shown in FIG. 5A, a silicon oxide film 18, serving as an intermediate layer between the silicon substrate 12 and the glass substrate 11, is formed on the silicon substrate 12 having the island-shaped portions 12a and 12b formed thereon. The silicon oxide film 18 is formed by, for example, a sputtering method or a CVD method. The intermediate layer provided between the silicon substrate 12 and the glass substrate 11 may be made of a material that forms Si—O bonding or Si—Si bonding with the silicon substrate 12 and/or the glass substrate 11 by heat generated by a thermal press when the silicon substrate 12 is pressed against the glass substrate 11. For example, a silicon oxide or glass can be used as such a material. In addition, the thickness of the intermediate layer is set such that the material forming the intermediate layer forms Si—O bonding or Si—Si bonding with the silicon substrate 12 and/or the glass substrate 11.

Figure 5B:
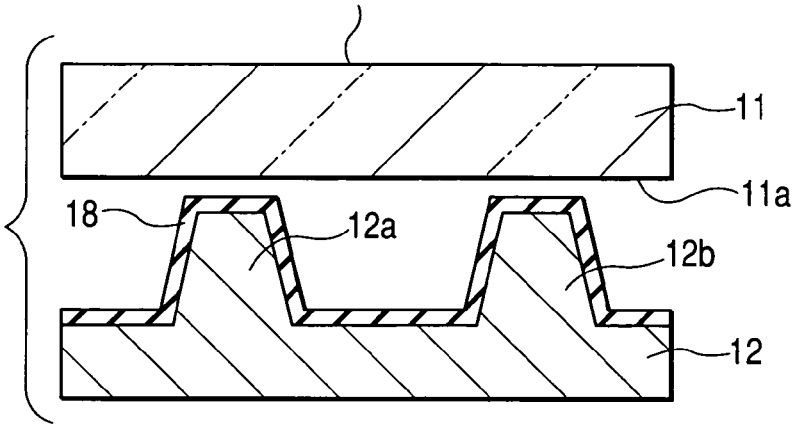
Figure 5C:
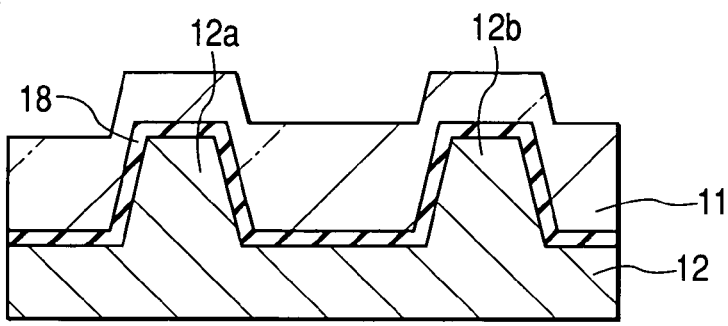

Next, as shown in FIG. 5B, the glass substrate 11 is mounted on the silicon substrate 12 having the silicon oxide film 18 formed thereon. Then, the silicon substrate 12 and the glass substrate 11 are heated, and then the silicon substrate 12 is pressed against the glass substrate 11 to push the island-shaped portions 12a and 12b in the main surface 11a of the glass substrate 11, thereby bonding the silicon substrate 12 and the glass substrate 11, as shown in FIG. 5C. At that time, the silicon oxide film 18 is interposed between the silicon substrate 12 and the glass substrate 11. In addition, preferably, a heating temperature is set to be smaller than a melting point of silicon and to deform glass. For example, a heating temperature of about 600° C. is preferable.

Further, in order to improve adhesion at an interface between the silicon substrate 12 and the silicon oxide film 18 and at an interface between the glass substrate 11 and the silicon oxide film 18, it is preferable to perform the anode bonding process. In this case, electrodes are placed on the silicon substrate 12 and the glass substrate 11, respectively, and then a voltage of about 300 V to 1 kV is applied thereto while applying heat at a temperature smaller than about 400° C. In this way, it is possible to improve adhesion at the interfaces, and thus to improve the airtightness of the space 15c of the capacitance-type pressure sensor.

Figure 5D:
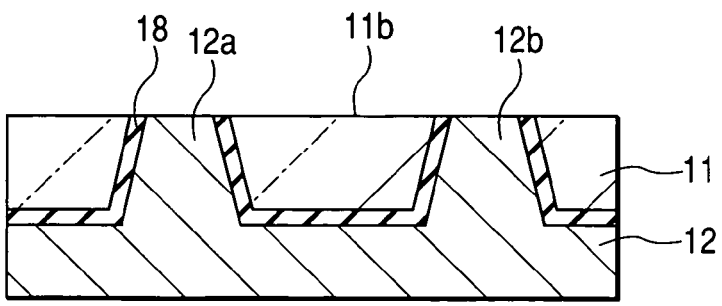
Figure 5E:
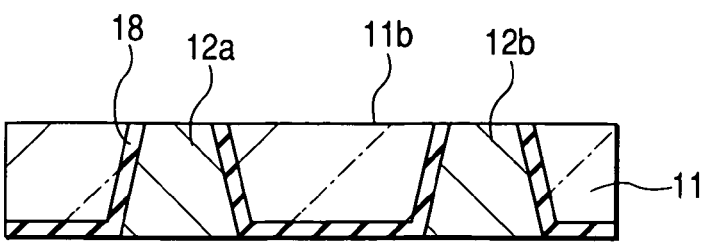

Subsequently, as shown in FIG. 5D, a polishing process is performed on the main surface 11b of the glass substrate 11 such that the island-shaped portions 12a and 12b are partially exposed from the main surface 11b. In this way, the island-shaped portions 12a and 12b are buried in the glass substrate 11. Then, as shown in FIG. 5E, the polishing process is performed on the silicon substrate 12 such that the island-shaped portions 12a and 12b are partially exposed from both surfaces of the glass substrate 11. In this way, the glass substrate of the invention (FIGS. 5D and 5E) is manufactured.

As described above, Si—O bonding or Si—Si bonding is formed between the silicon oxide film 18 and the silicon substrate 12 and the glass substrate 11 at the corner portions 12c of the island-shaped portions 12a and 12c by providing the silicon oxide film 18, serving as an intermediate layer between the silicon substrate 12 and the glass substrate 11. Therefore, it is possible to improve the adhesion between the silicon substrate 12 and the glass substrate 11 at the corner portions 12c. In addition, it is possible to more improve the airtightness between the silicon substrate 12 and the glass substrate 11, and thus to prevent the leakage of air at the interfaces therebetween. As a result, the burying characteristic of the silicon substrate into the glass substrate can be improved, which makes it possible to reduce the size of island-shaped portions and to arrange them at high density.

Figure 6A:
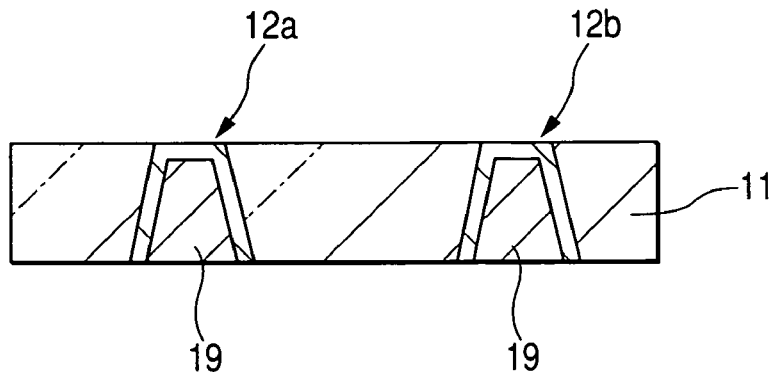
FIGS. 6A and 6B are cross-sectional views illustrating other structures of the island-shaped portions, respectively.
Figure 6B:
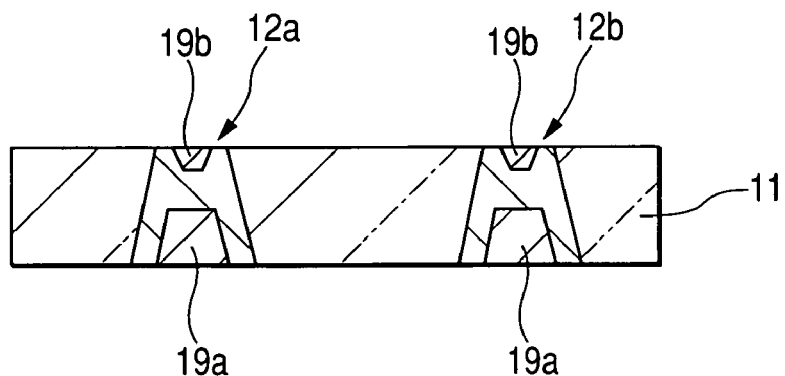

In the glass substrate of the invention shown in FIGS. 2D and 2E, in order to reduce the resistance of the island-shaped portions 12a and 12b, it is preferable to provide metal layers inside the island-shaped portions 12a and 12b, respectively, as shown in FIGS. 6A and 6B. In the structure shown in FIG. 6A, a concave portion is formed in one main surface of each of the island-shaped portions 12a and 12b, and then a metallic material is filled into the concave portions, thereby forming metal layers. In the structure shown in FIG. 6B, concave portions are respectively formed in both main surfaces of each of the island-shaped portions 12a and 12b, and then a metallic material is filled into the concave portions, thereby forming metal layers 19a and 19b. In addition, the metal layers 19 are made of, for example, a material having low resistance, such as Cu. As described above, since the metal layers 19 are respectively formed in the island-shaped portions 12a and 12b so as to be exposed from at least one main surface of the glass substrate 11, it is possible to reduce the resistance of conductive portions of the island-shaped portions 12a and 12b, and also to reduce the power consumption of a device to be used. As a result, it is possible to apply the glass substrate of the invention to, for example, a high-frequency device.

When the metal layers 19 are provided in the island-shaped portions 12a and 12b, a mask is provided on the island-shaped portions 12a and 12b in regions where the metal layers 19 are formed after the glass substrate shown in FIG. 2E is prepared, and then concave portions are formed in the island-shaped portions 12a and 12b using the mask. In this case, the concave portions are formed by, for example, a dry etching method or a sand blast method. Then, a metallic material is filled into the concave portions to form the metal layers 19. In this case, the metallic material is filled into the concave portions by, for example, a sputtering method, a deposition method, or a plating method. Thereafter, a polishing process is performed on the surface of the glass substrate to planarize it, if necessary.

Figure 7:
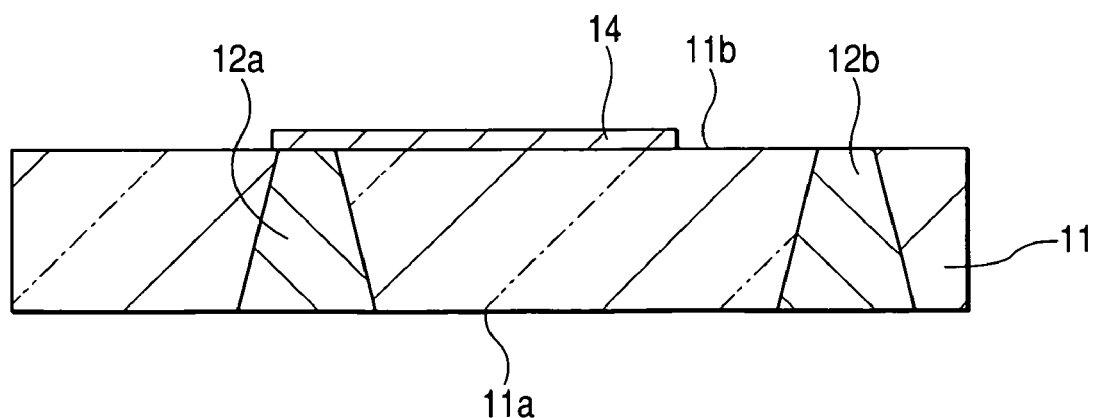
FIG. 7 is a cross-sectional view illustrating a method of manufacturing the capacitance-type pressure sensor using the glass substrate obtained from FIG. 2E.

Subsequently, a capacitance-type pressure sensor is manufactured using the glass substrate obtained by the above-mentioned process. As shown in FIG. 7, the electrode 14 is formed on the main surface 11b of the glass substrate 11 so as to be electrically connected to the island-shaped portion 12a. In this case, first, an electrode material is attached to the main surface 11b of the glass substrate 11, and then a resist film is formed thereon. Then, the resist film is patterned (by a photolithography technique) so as to remain in an electrode forming region, and the electrode material is etched using the remaining resist film as a mask. Subsequently, the remaining resist film is removed.

Successively, as shown in FIG. 1, the silicon substrate 15 having the pressure sensing diaphragm 15a that is deformed by pressure to be measured is bonded to the main surface 11b of the glass substrate 11 such that that the pressure sensing diaphragm 15a is separated from the electrode 14 at a predetermined gap. In this case, concave portions are formed in both main surfaces of the silicon substrate 15 by etching them to form the pressure sensing diaphragm 15a. As the etching method, dry etching or wet etching can be used. However, when the wet etching is performed, it is preferable to perform anisotropy etching for defining a crystal surface of the silicon substrate 15 such that a difference in etching rate occurs. In particular, since a tapered surface 15d is formed in the concave portion not having the space 15c in the silicon substrate 15, preferably, the concave portion is formed by the anisotropy etching.

The concave portion having the space 15c in the silicon substrate 15 is formed to have a sufficient size to surround the electrode 14 provided on the glass substrate 11. In addition, the depth of the concave portion is determined in consideration of, for example, the gap between the pressure sensing diaphragm 15a and the electrode 14 and the thickness of the electrode 14. Then, the silicon substrate 15 having the concave portions in both surfaces thereof manufactured in this way is mounted on the main surface 11b of the glass substrate 11, with the concave portion having the tapered surface 15d facing upward, that is, with the concave portion not having the tapered surface 15d facing the glass substrate 11, and then the anode bonding process is performed thereon. In this case, the anode bonding process is performed on the silicon substrate 15 and the glass substrate 11 under the conditions of a heating temperature of 400° C. or less and a voltage of about 500 V. In this way, it is possible to improve adhesion at the interface between the silicon substrate 15 and the glass substrate 11 and to improve the airtightness of the space 15c.

Then, the electrodes 13a and 13b are formed on the main surface 11a of the glass substrate 11 so as to be electrically connected to the island-shaped portions 12a and 12b, respectively. In this case, first, an electrode material is attached to the main surface 11a of the glass substrate 11, and then a resist film is formed thereon. Then, the resist film is patterned (by the photolithography technique) so as to remain in an electrode forming region, and the electrode material is etched using the remaining resist film as a mask. Subsequently, the remaining resist film is removed.

In the capacitance-type pressure sensor obtained in this way, the electrode 14, which is a fixed electrode, is electrically connected to the electrode 13a through the island-shaped portion 12a, and the pressure sensing diaphragm 15a, which is a movable electrode, is electrically connected to the electrode 13b through the island-shaped portion 12b. This structure enables a signal indicating the variation of capacitance measured between the pressure sensing diaphragm 15a and the electrode 14 to be acquired from the electrode 13a through the island-shaped portion 12b. In addition, it is possible to calculate a measured pressure based on this signal.

Second Embodiment

Figure 8:
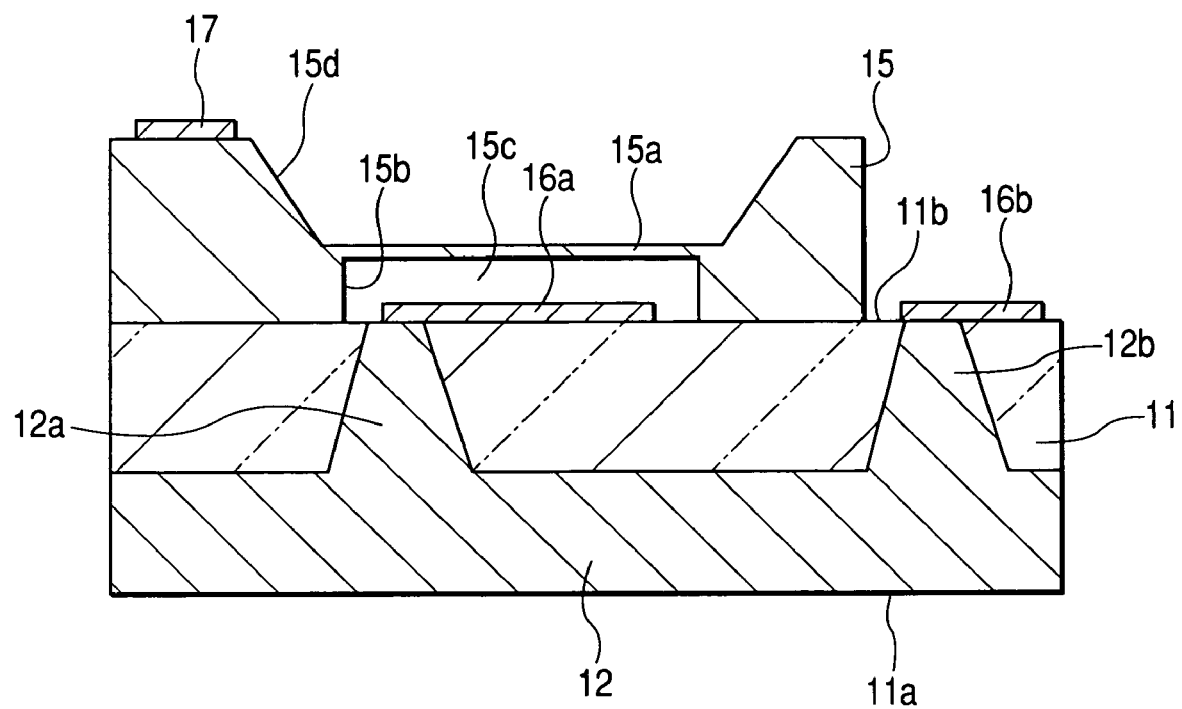
FIG. 8 is a cross-sectional view schematically illustrating the structure of a capacitance-type pressure sensor having a glass substrate according to the second embodiment of the invention.

FIG. 8 is a cross-sectional view schematically illustrating the structure of a capacitance-type pressure sensor having a glass substrate according to a second embodiment of the invention. In FIG. 8, the same components as those in FIG. 1 have the same reference numerals, and a detailed description thereof will be omitted for the convenience of explanation.

A glass substrate 11 and a silicon substrate 12 are bonded to each other. At that time, island-shaped portions 12a and 12b made of silicon are buried in the glass substrate 11. In addition, the island-shaped portions 12a and 12b are partially exposed from a main surface 11b of the glass substrate 11. Therefore, the island-shaped portions 12a and 12b are electrically connected to each other in a silicon layer formed on a main surface 11a.

An electrode 16a is formed on the main surface 11b of the glass substrate 11 so as to be electrically connected to an exposed portion of the island-shaped portion 12a, and an electrode 16b is also formed thereon so as to be electrically connected to an exposed portion of the island-shaped portion 12b.

Further, a silicon substrate 15 having a pressure sensing diaphragm 15a (movable electrode) is bonded to the main surface 11b of the glass substrate 11. The pressure sensing diaphragm 15a has the same structure as that in the first embodiment. Further, a predetermined gap is formed between the pressure sensing diaphragm 15a and the electrode 16a, and thus capacitance is formed between the pressure sensing diaphragm 15a and the electrode 16a. In addition, an electrode 17 for a movable electrode is provided on a surface of the silicon substrate 15 opposite to a bonding 'surface between the silicon substrate 15 and the glass substrate 11.

Similar to the first embodiment, an interface 11c between the glass substrate 11 and the island-shaped portion 12a and an interface 11d between the glass substrate 11 and the island-shaped portion 12b have a high degree of adhesion. Therefore, it is possible to keep airtightness of a space 15c formed between the pressure sensing diaphragm 15a and the main surface 11b of the glass substrate 11 at a high level.

In the capacitance-type pressure sensor having the above-mentioned structure, similar to the first embodiment, a predetermined capacitance is formed between the pressure sensing diaphragm 15a and the electrode 16a of the glass substrate 11. When pressure is applied to the capacitance-type pressure sensor, the pressure sensing diaphragm 15a is operated by the applied pressure. Then, the pressure sensing diaphragm 15a is deformed. At that time, capacitance between the pressure sensing diaphragm 15a and the electrode 16a of the glass substrate 11 is varied. Therefore, it is possible to consider the variation of the capacitance as a pressure variation. As described above, since a high degree of adhesion is obtained at the interface 11c between the glass substrate 11 and the island-shaped portion 12a and at the interface 11d between the glass substrate 11 and the silicon substrate 15, it is possible to consider only the displacement of the pressure sensing diaphragm 15a as pressure to be measured. Therefore, the variation of the capacitance between the pressure sensing diaphragm 15a and the electrode 16a caused by the displacement of the pressure sensing diaphragm 15a is accurately reflected to the variation of pressure, and thus it is possible to accurately measure a pressure variation corresponding to the variation of capacitance.

Figure 9A:
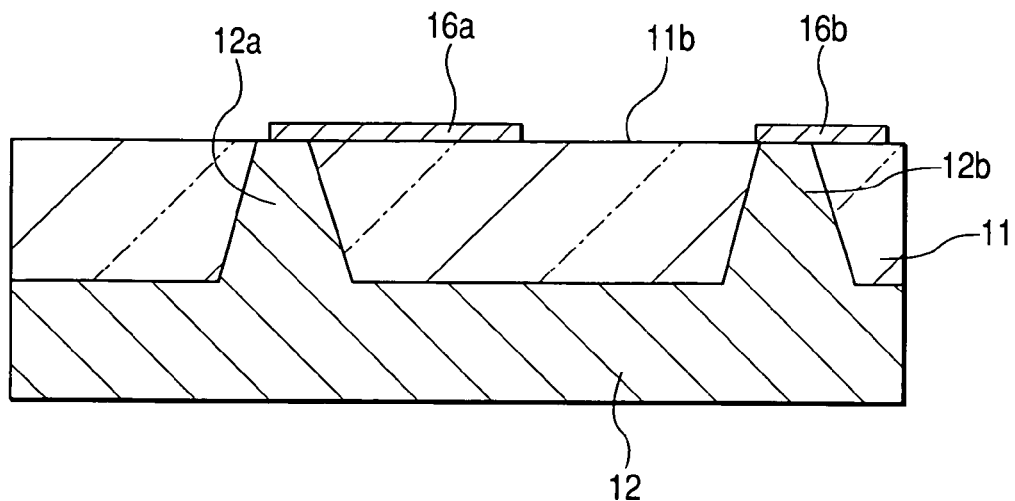
FIGS. 9A and 9B are cross-sectional views illustrating a method of manufacturing a capacitance-type pressure sensor having the glass substrate obtained from FIG. 2.
Figure 9B:
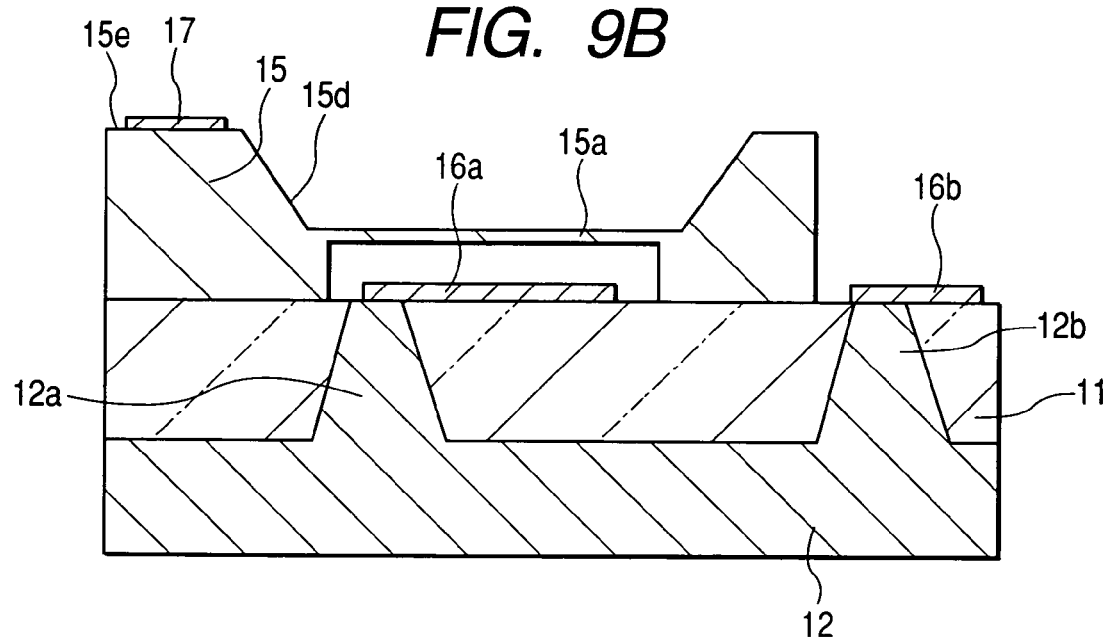
Figure 10:
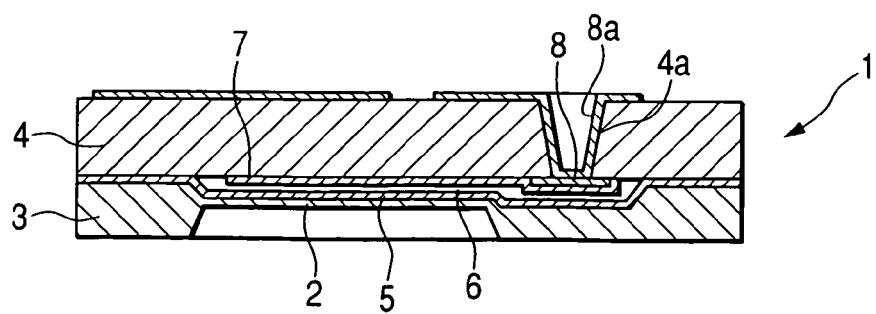
FIG. 10 is a cross-sectional view schematically illustrating the structure of a conventional capacitance-type pressure sensor.

Next, a method of manufacturing the capacitance-type pressure sensor using the glass substrate according to this embodiment will be described. FIGS. 9A and 9B are cross-sectional views illustrating the method of manufacturing the capacitance-type pressure sensor using the glass substrate obtained from FIG. 2D.

A manufacturing method of the glass substrate is the same as that in the first embodiment. In this embodiment, a glass substrate has the structure shown in FIG. 2D. As shown in FIG. 9A, the electrodes 16a and 16b are formed on the main surface 11b of the glass substrate 11 so as to be electrically connected to the island-shaped portions 12a and 12b, respectively. In this case, first, an electrode material is attached on the main surface 11b of the glass substrate 11, and then a resist film is formed thereon. Then, the resist film is patterned (by a photolithography technique) so as to remain in an electrode forming region, and the electrode material is etched using the remaining resist film as a mask. Subsequently, the remaining resist film is removed.

Successively, as shown in FIG. 9B, the silicon substrate 15 having the pressure sensing diaphragm 15a that is deformed by pressure to be measured is bonded to the main surface 11b of the glass substrate 11 such that the pressure sensing diaphragm 15a is separated from the electrode 16a at a predetermined gap. The pressure sensing diaphragm 15a is formed in the same method as that used in the first embodiment.

Then, an electrode 17 is provided on a surface 15e of the silicon substrate 15 opposite to a bonding surface between the silicon substrate 15 and the glass substrate 11. In this case, first, an electrode material is attached on the surface 15e of the silicon substrate 15, and then a resist film is formed thereon. Then, the resist film is patterned (by a photolithography technique) so as to remain in an electrode forming region, and the electrode material is etched using the remaining resist film as a mask. Subsequently, the remaining resist film is removed. In this embodiment, the electrode 17 is provided on the surface 15e of the silicon substrate 15. However, the electrode 17 may be provided on the main surface 11b of the glass substrate 11 so as to be electrically connected to the silicon substrate 15, without being electrically connected to the island-shaped portions 12a and 12b. In this case, the electrode 17 and the electrode 16b are formed on the same surface, which results in an increase in the degree of freedom of the wiring layout.

Then, the silicon substrate 15 having the concave portions in both surfaces thereof that is manufactured in this way is mounted on the main surface 11b of the glass substrate 11, with the concave portion having the tapered surface 15d facing upward, that is, with the concave portion not having the tapered surface 15d facing the glass substrate 11, and then the anode bonding process is performed thereon. In this case, the anode bonding process is performed in the same manner as that used in the first embodiment. In this way, it is possible to improve adhesion at the interface between the silicon substrate 15 and the glass substrate 11, and thus to improve the airtightness of the space 15c.

In the capacitance-type pressure sensor obtained in this way, the electrode 16a, which is a fixed electrode, is electrically connected to the electrode 16b through the island-shaped portions 12a and 12b, and the pressure sensing diaphragm 15a, which is a movable electrode, is electrically connected to the electrode 17. This structure enables a signal indicating a variation of capacitance measured between the pressure sensing diaphragm 15a and the electrode 16a to be acquired from the electrode 16b through the island-shaped portions 12a and 12b. In addition, it is possible to calculate a measured pressure based on this signal.

Next, the embodiments performed to obtain remarkable effects of the invention will be described. The inventors examined the airtightness of the capacitance-type pressure sensor of the invention shown in FIGS. 1 to 8 and that of a conventional capacitance-type pressure sensor. More specifically, first, the capacitance-type pressure sensor shown in FIGS. 1 to 8 and a conventional capacitance-type pressure sensor obtained by forming a hole in a glass substrate and by filling the hole with a metallic material using a plating method are prepared. Then, they are put into a pressure chamber, and then pressure is applied thereto. Then, it is examined whether the pressure sensing diaphragm is operated under this condition. As a result, in the capacitance-type pressure sensor shown in FIGS. 1 to 8, the diaphragm is operated by the applied pressure, and the operation state is maintained. The findings of the inventors demonstrate that a high degree of adhesion is obtained at the interface 11c between the glass substrate 11 and the island-shaped portion 12a and at the interface 11d between the glass substrate 11 and the silicon substrate 15, which results in a high degree of airtightness of the space 15c. On the other hand, when pressure is increasingly applied to the conventional capacitance-type pressure sensor put into the pressure chamber, the pressure sensing diaphragm is operated to be warped toward the glass substrate 11, and then returns to the original position thereof before long. As a result, the adhesion between the glass substrate and the island-shaped portions is deteriorated, which causes the deterioration of the airtightness of the space.

In the first and second embodiments of the invention, the concave portions are formed in both surfaces of the silicon substrate 15, and then the silicon substrate 15 is bonded to the glass substrate 11. However, a concave portion may be formed in one surface of the silicon substrate 15, and then the silicon substrate 15 may be bonded to the glass substrate 11 such that the concave portion faces the glass substrate 11, thereby forming a space therebetween. Then, the diaphragm 15a may be formed in the other surface of the silicon substrate 15 by etching it. This structure prevents the diaphragm from being excessively warped by electrostatic attraction when the silicon substrate 15 is bonded to the glass substrate 11 by the anode bonding method.

As described above, according to the invention, since a high degree of adhesion is obtained at an interface between the glass substrate and the silicon substrate, it is possible to improve the airtightness of a space between a fixed electrode and a movable electrode in a capacitance-type pressure sensor, which makes it possible to accurately measure capacitance corresponding to pressure to be measured.

The invention is not limited to the first and second embodiments, but various changes and modifications can be made without departing from the scope and spirit of the invention. For example, the invention is not limited to numerical values and materials described in the first and second embodiment, but the numerical values and materials can be properly changed within the scope of the invention.

The invention claimed is:

1. A glass substrate comprising:
   a glass substrate body that has a pair of main surfaces opposite to each other;
   a plurality of island-shaped silicon portions that are buried in the glass substrate such that at least portions thereof are exposed from the pair of main surfaces; and
   a silicon substrate bonded to the glass substrate and disposed on one main surface of the glass substrate body,
   wherein at least one of the island-shaped silicon portions comes in contact with a part of the silicon substrate and is electrically connected to the silicon substrate,
   wherein each of the island-shaped silicon portions extends from a first main surface of the glass substrate body to a second main surface of the glass substrate body through the glass substrate body, and
   wherein a major part of the glass substrate body have a thickness that substantially equals to a thickness of the island-shaped silicon portions from the first main surface to the second main surface; and
   wherein the island-shaped silicon portions have metal layers buried in a concave portion formed therein under at least one of the main surfaces of each of the island-shaped silicon portions, the metal layers having an exposed surface exposed from the at least one of the main surfaces, the metal layers being entirely surrounded by the corresponding island-shaped silicon portion except the exposed surface such that the metal layers do not have an interface with the glass substrate body.

2. The glass substrate according to claim 1,
wherein at least one of the island-shaped silicon portions is not electrically connected to the silicon substrate and the glass substrate is made of a glass material including alkali metal.

3. A glass substrate comprising;
a glass substrate body that has a pair of main surfaces opposite to each other;
a plurality of island-shaped silicon portions that are buried in the glass substrate such that at least portions thereof are exposed from the pair of main surfaces;
a silicon substrate bonded to the glass substrate and disposed on one main surface of the glass substrate body; and
an oxide layer formed at interfaces between the glass substrate and the island-shaped portions so as to provide Si—O bonding,
wherein at least one of the island-shaped silicon portions comes in contact with a part of the silicon substrate and is electrically connected to the silicon substrate,
wherein each of the island-shaped silicon portions extends from a first main surface of the glass substrate body to a second main surface of the glass substrate body through the glass substrate body, and
wherein a major part of the glass substrate body have a thickness that substantially equals to a thickness of the island-shaped silicon portions from the first main surface to the second main surface.

4. A capacitance-type pressure sensor comprising:
an electrode that is disposed on one main surface of the glass substrate according to claim 1 and that is electrically connected to the island-shaped silicon portions not coming in contact with the silicon substrate,
wherein the silicon substrate is disposed on the main surface having the electrode formed thereon so as to have a portion opposite to the electrode with a predetermined gap therebetween,
wherein a variation in capacitance between the electrode and the silicon substrate is measured.

5. The capacitance-type pressure sensor according to claim 4, wherein the silicon substrate is bonded to the glass substrate so as to cover the electrode and to hermetically seal the space around the electrode,
wherein the portion opposite to the electrode includes a pressure sensing diaphragm that is deformed by pressure to be measured, and
wherein a variation in capacitance between the electrode and the pressure sensing diaphragm is measured as a pressure variation.

* * * * *